UNITED STATES PATENT OFFICE.

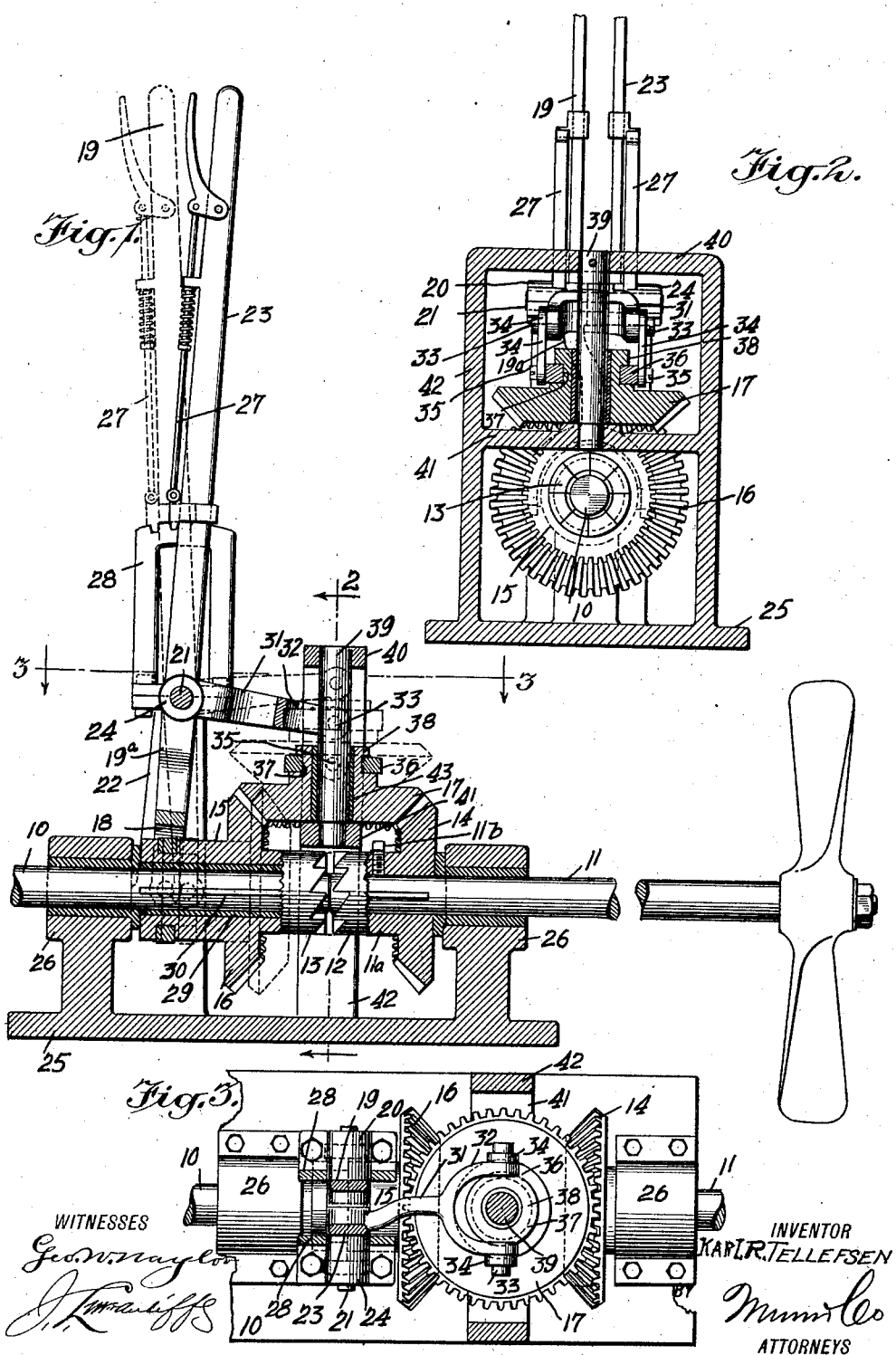

KARL R. TELLEFSEN, OF BROOKLYN, NEW YORK.

REVERSING MECHANISM FOR SHAFTS.

1,394,373. Specification of Letters Patent. Patented Oct. 18, 1921.

Application filed August 10, 1920. Serial No. 402,654.

*To all whom it may concern:*

Be it known that I, KARL R. TELLEFSEN, a citizen of Norway, and a resident of the city of New York, borough of Brooklyn, in the county of Kings and State of New York, have invented a new and Improved Reversing Mechanism for Shafts, of which the following is a description.

My invention has for its general object to provide a novel reversing mechanism adapted to be associated with drive and driven sections of a shaft, such as a marine engine shaft, whereby to effect with facility and despatch either a direct drive between the shaft sections or to bring into play a reversing means for giving reverse movement to the driven shaft section.

Reference is to be had to the accompanying drawings forming a part of this specification, it being understood that the drawings are merely illustrative of one example of the invention.

Figure 1 is a longitudinal vertical section of a reversing mechanism embodying my invention, showing the same in connection with the sections of a propelling shaft;

Fig. 2 is a transverse vertical section on the line 2—2, Fig. 1;

Fig. 3 is a sectional plan view, the section being taken on the line 3—3, Fig. 1.

In the illustrated example of my invention the numeral 10 indicates a portion of a drive section of a shaft and 11, the driven section. Said driven section of the shaft presents a clutch element 12 rigid therewith and the opposed end of the drive section 10 presents a mating clutch element 13 slidably mounted to be moved into or out of engagement with the clutch section 12.

On the driven shaft section 11 adjacent to the end having the clutch element 12 is fixed a driven gear element 14 here shown as a bevel gear, said gear element and the clutch 13 being preferably formed on a sleeve 11ª secured to the driven shaft section 11 by a suitable means, such as a set screw 11ᵇ. Rigid with the slidable clutch element 13 is a bevel gear 16, said clutch element and bevel gear being rigid on a sleeve 15 slidable on the drive shaft section 10.

An intermediate bevel gear 17 is adapted to be shifted axially into or out of engagement with the bevel gears 14 and 16 for reverse driving of the shaft section 11 or out of engagement with said gears 14, and 16 to permit the sleeve 15 to be moved for throwing the clutch element 13 into engagement with the clutch element 12 for the direct drive of the shaft section 11.

The illustrated means for shifting the sleeve 15 consists of a clutch fork 18 on the lower arm 19ª of a hand lever 19, the fulcrum eye 20 of which (Fig. 2) is rockably mounted on a transverse pin 21 of a frame 22 rising from the base plate 25. Said base plate has alined bearings 26 for shaft sections 10, 11. The sleeve 15 has a bushing 29 therein slidable on the shaft section 10 to be held against independent turning movement by a spline 30.

For lowering and raising the intermediate gear element 17 to or from a plane to engage the gear elements 14, and 16, a hand lever 23 is provided, the fulcrum eye 24 of which is fulcrumed on the pin 21. The latches 27 of the levers 19 and 23 are adapted to engage the toothed sectors 28 rising from the frame 22. The lever 23 is of bellcrank form to present at its lower end a lateral arm 31 terminating in a fork 32, the arms of which are pivotally connected by screws 33 or the like with the upper ends of links 34, said links at their lower ends being pivotally secured as by screws 35 to a ring 36 loose in an annular groove 37 formed in the hub 38 of the reversing bevel gear 17. The bevel gear 17 is shown as sleeved on a fixed vertical guide pin 39 fast at its upper and lower ends in upper and lower transverse frame members 40 and 41, of uprights rigid with the base 25. The numeral 43 indicates the bushing of the bevel gear 17.

With the described arrangement when it is desired to directly drive the section 11 from the drive section 10, the lever 23 is rocked to lift the intermediate gear element 17 out of engagement with the gear elements 14 and 16 and away from the path of movement of the gear element 16 so that said intermediate gear element will lie approximately in the position indicated by dotted lines in Fig. 1. The lever 19 is now rocked to cause its fork 18 to shift the sleeve 15 so that the clutch element 13 engages with the clutch element 12 by reason of which the drive of the shaft 11 will be direct, the gear elements 14 and 16 merely idling. In order to reverse the direction of turning of the driven shaft section 11, the sleeve 15 is shifted through the medium of lever 19 to disengage the clutch sections 12 and 13 and to bring the gear element 16 to the full line position of Fig. 1. The lever 23 is now rocked to lower the gear element 17 from the dotted line position Fig. 1 to the full line position and into engagement with the gear elements 14 and 16. It is to be noted that the described reversing mechanism is additional to the usual means for controlling the drive connection between the drive shaft 10 and the motive power.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A reversing mechanism of the class described, including a drive shaft section, a driven shaft section, a clutch element on the one section, a mating clutch element mounted on the other of said shaft sections to turn therewith and to slide thereon out of clutching engagement with the first clutch element or into engagement therewith for direct drive of said driving shaft section, a gear element on that shaft section having the first mentioned clutch element, a gear element slidable on the drive shaft section, and an intermediate gear element shiftable to be disposed in a plane engaging the other mentioned gear elements when the clutches are disengaged, whereby to reverse the driven shaft section, or to a position out of engagement with said other gear elements for permitting engagement of the clutch elements for direct drive of the driven shaft section.

2. A reversing mechanism of the class described including a drive shaft section, a driven shaft section, coacting direct drive means on the respective shaft sections, the means on one shaft section being slidable into or out of engagement with the coacting means on the other shaft section for direct drive, and means to effect an indirect drive connection between said sections for reversing the driven shaft section, said last-mentioned means including a gear element on the driven shaft section, a driven gear element on the drive shaft section, and an intermediate gear element, said second mentioned gear element being slidable on the drive shaft section and said intermediate gear element being shiftable axially into or out of position to engage the first and second-mentioned gear elements and into or out of the path of movement of the second-mentioned gear element.

3. A reversing mechanism of the class described including drive and driven shaft sections, the driven section having a rigid clutch element and the drive section having a shiftable clutch element, to engage the first clutch element, a slidable sleeve on which the second-mentioned clutch element is rigid, a bevel gear element on said sleeve, a second bevel gear element fast on the drive shaft section, an intermediate gear element shiftable axially into or out of engagement with both of the other gear elements, a shifting lever for said sleeve, a second lever, and means connecting the second lever with said intermediate gear to shift the latter.

4. A reversing mechanism of the class described including drive and driven shaft sections, the driven section having a rigid clutch element and the drive section having a shiftable clutch element, to engage the first clutch element, a slidable sleeve on which the second-mentioned clutch element is rigid, a bevel gear element on said sleeve, a second bevel gear element fast on the drive shaft section, an intermediate gear element shiftable axially into or out of engagement with both of the other gear elements, a lever fulcrumed between its ends above the shaft sections and presenting an arm engaging said sleeve to slide the latter, a second lever of bellcrank form fulcrumed above the shaft sections, one arm of the lever being laterally disposed, means connecting said arm with said intermediate gear element to raise or lower the latter, and relatively fixed guide means for said intermediate element.

KARL R. TELLEFSEN.